(12) United States Patent
Veryard et al.

(10) Patent No.: US 12,107,772 B2
(45) Date of Patent: Oct. 1, 2024

(54) RESOURCE CAPACITY MANAGEMENT

(71) Applicant: BRITISH TELECOMMUNICATIONS PUBLIC LIMITED COMPANY, London (GB)

(72) Inventors: Lewis Veryard, London (GB); Andrew Hardwick, London (GB); Anthony Conway, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 18/264,981

(22) PCT Filed: Feb. 9, 2022

(86) PCT No.: PCT/EP2022/053072
§ 371 (c)(1),
(2) Date: Aug. 10, 2023

(87) PCT Pub. No.: WO2022/171649
PCT Pub. Date: Aug. 18, 2022

(65) Prior Publication Data

US 2024/0137330 A1 Apr. 25, 2024
US 2024/0236014 A9 Jul. 11, 2024

(30) Foreign Application Priority Data

Feb. 10, 2021 (GB) ...................................... 2101864

(51) Int. Cl.
*H04L 47/762* (2022.01)
*H04L 47/70* (2022.01)
(Continued)

(52) U.S. Cl.
CPC .......... *H04L 47/762* (2013.01); *H04L 47/781* (2013.01); *H04L 47/805* (2013.01); *H04L 47/824* (2013.01); *H04L 47/827* (2013.01)

(58) Field of Classification Search
CPC ..... H04L 47/801; H04L 47/10; H04L 47/781; H04L 47/827; H04L 47/824; H04L 47/805; H04L 47/822; H04L 47/70; H04L 47/762
See application file for complete search history.

(56) References Cited

U.S. PATENT DOCUMENTS 6,148,335 A 11/2000 Haggard et al.
6,826,552 B1 * 11/2004 Grosser .................. G06Q 10/06 706/45
(Continued)

FOREIGN PATENT DOCUMENTS

GB 2390775 A 1/2004
GB 2390775 B 7/2005

OTHER PUBLICATIONS

"International Search Report and Written Opinion received for PCT Patent Application No. PCT/EP2022/053072, mailed on May 9, 2022".

(Continued)

*Primary Examiner* — Ninos Donabed
(74) *Attorney, Agent, or Firm* — PRANGER LAW PC (57) ABSTRACT

A computer implemented method of allocating a set of communications network resources to resource consumers in a digital communications system can include generating a set of multiple allocation schemes; iteratively applying a genetic algorithm to the set of allocation schemes to generate, at each iteration, a new set of allocation schemes as a generation of allocation schemes based on a preceding generation; and, responsive to a predetermined stopping condition for the iteration, assigning resource consumers to (Continued)

resources in the communications system in accordance with an allocation scheme in a most recent generation determined to satisfy a ranking condition.

15 Claims, 2 Drawing Sheets

(51) Int. Cl.
*H04L 47/78* (2022.01)
*H04L 47/80* (2022.01)

(56) References Cited

U.S. PATENT DOCUMENTS

| | | | | |
|---|---|---|---|---|
| 7,525,970 | B2* | 4/2009 | Mangin | H04W 72/56 370/395.42 |
| 7,593,839 | B1* | 9/2009 | Wu | G06F 30/13 703/2 |
| 7,643,974 | B2* | 1/2010 | Harper | F17D 3/00 703/7 |
| 9,226,162 | B2* | 12/2015 | Zhuang | H04W 16/12 |
| 9,361,175 | B1* | 6/2016 | Bose | G06F 11/079 |
| 10,187,180 | B2* | 1/2019 | Sorrentino | H04L 1/0026 |
| 10,769,321 | B2* | 9/2020 | Ferri, II | G06F 30/18 |
| 11,431,645 | B2* | 8/2022 | Zhou | H04L 12/56 |
| 2011/0054869 | A1* | 3/2011 | Li | G01V 20/00 703/10 |
| 2014/0179335 | A1* | 6/2014 | Pikhletsky | H04W 72/04 455/452.2 |
| 2015/0029961 | A1* | 1/2015 | Chae | H04W 72/542 370/329 |
| 2015/0170052 | A1* | 6/2015 | Abdul Rahman | G06N 3/126 706/13 |
| 2015/0208246 | A1* | 7/2015 | Zhuang | H04W 16/10 455/451 |
| 2015/0279174 | A1* | 10/2015 | Hyde | G06F 3/0481 340/815.4 |
| 2015/0279176 | A1* | 10/2015 | Hyde | G06Q 10/06 340/815.4 |
| 2016/0217170 | A1 | 7/2016 | Andescavage et al. | |
| 2017/0353932 | A1* | 12/2017 | Sorrentino | H04W 52/383 |
| 2017/0372411 | A1* | 12/2017 | Kolegraff | G07C 9/38 |
| 2018/0270155 | A1 | 9/2018 | Lee et al. | |
| 2018/0288470 | A1 | 10/2018 | Jeyachandran et al. | |
| 2018/0288740 | A1* | 10/2018 | Ansari | H04W 16/10 |
| 2020/0120510 | A1* | 4/2020 | Gresset | B61L 27/70 |
| 2021/0217080 | A1* | 7/2021 | Feng | G06Q 40/03 |
| 2022/0358586 | A1* | 11/2022 | Ganguly | G06N 3/084 |

OTHER PUBLICATIONS

"Search Report received for Great Britain Patent Application No. 2101864.3, mailed on Oct. 27, 2021".

Li, Congcong, et al., "Energy-Efficient Subcarrier-Bit-Power Allocation Based on Genetic Algorithm", 9th International Conference on Communications and Networking in China, IEEE, XP032742121, DOI: 10.1109/CHINACOM.2014.7054363 section III, pp. 583-588.

Mallawaarachchi, V., "Introduction to Genetic Algorithms— Including Example Code", Towards Data Science, Retrieved on Aug. 1, 2023, 17 pages.

Shahid, Adnan, et al., "Genetic Algorithm Based Self-Organized Resource Allocation in LTE-Advanced Network", 2014 Sixth International Conference on Ubiquitous and Future Networks (ICUFN), IEEE, XP032627927, DOI: 10.1109/ICUFN.2014.6876766 section II section IV, pp. 133-137.

Sharma, Nitin, et al., "Genetic Algorithm Aided Proportional Fair Resource Allocation in Multicast OFDM Systems", IEEE Transactions on Broadcasting, IEEE Service Center, Piscataway, NJ, US, vol. 61, No. 1, XP011574120, ISSN: 0018-9316, DOI: 10.1109/TBC.2015.2389692 [retrieved on Mar. 2, 2015] section IV section V, pp. 16-29.

* cited by examiner

RESOURCE CAPACITY MANAGEMENT

PRIORITY CLAIM

The present application is a National Phase entry of PCT Application No. PCT/EP2022/053072, filed Feb. 9, 2022, which claims priority from GB Patent Application No. 2101864.3, filed Feb. 10, 2021, each of which is hereby fully incorporated herein by reference.

TECHNICAL FIELD

The present disclosure relates to the management of resources.

BACKGROUND

Digital communications systems encompass networks, network equipment, appliances, software, virtualized components, physical infrastructure and other components that all constitute resources of the system. Resources are allocated for consumption by resource consumers, the nature of which can differ depending on context. The allocation of consumers to resources needs to be balanced against objectives of the communications system which can include, inter alia, for example: to ensure a capacity of a resource is not exceeded; to ensure that the burdens on a resource do not unacceptably affect performance of the resource; to satisfy overall power consumption constraints, requirements or to reduce power consumption; to reduce a number of resources required; and other objectives as will be apparent to those skilled in the art.

For example, logical resources such as Virtual Local Area Networks (VLAN) can be implemented to make a physical LAN act like a set of multiple LANs. A logical hierarchy of VLANs can be provided, for example. Conventionally, for a 2-layer system, an inner layer is provided called a CVLAN (Customer VLAN) and an outer is provided called an SVLAN (Service VLAN). For example, telecommunications providers can use such VLANs in network exchanges as headends with a CVLAN (a resource consumer) for each domestic broadband connection and SVLANs (a resource) for aggregation by network service providers. Ideally the total load in each SVLAN resource should not get too near (or exceed) the SVLAN's capacity and that requires careful selection of which consuming CVLANs should be allocated to which resource SVLANs. Notably, CVLAN load can vary greatly with time, and transitioning a CLVAN between SVLANs is not an instant process and comes with potential service interruption or degradation. It is thus beneficial to identify a suitable association of resource consumers to resources in advance rather than simply being reactive.

In a further example, telecommunications exchanges such as those for the provision of telecommunications, broadband and other services, have an overall power capacity and benefit from a reduction in the amount of network equipment in order to reduce the total power consumption. This is a multilayer optimization problem as services run through physical cables which run through ports which are in cards which are in slots which are on shelves which are in racks within the exchange. Working out how best to rearrange such resources and resource consumers to decommission some resources while also ensuring all resource consumers are suitably provided resource is not trivial.

SUMMARY

Accordingly it is desirable to provide improvements to the allocation of communications network resources to resource consumers in digital communications systems.

According to a first aspect of the present disclosure, there is provided a computer implemented method of allocating a set of communications network resources to resource consumers in a digital communications system, the method comprising: generating a set of multiple allocation schemes each encoding the set of resources such that each resource is associated with a set of resource consumers, wherein each allocation scheme has associated a fitness measure evaluated based on the encoded set of resources and consumers in the scheme; iteratively applying a genetic algorithm to the set of allocation schemes to generate, at each iteration, a new set of allocation schemes as a generation of allocation schemes based on a preceding generation such that each allocation scheme in at least a subset of the allocation schemes in a generation is generated based on selected pairs of allocation schemes in a preceding generation, wherein the pairs of allocation schemes are selected by ranking the allocation schemes in the preceding generation based on the fitness measures, wherein each resource in each allocation scheme has associated an adjustable metric indicative of an age of an association between the resource and resource consumers in the allocation scheme, and the allocation scheme has associated a derived metric calculated based on the adjustable metric for each resource in the allocation scheme, wherein the ranking of the allocation schemes is based on the fitness measures of the allocation schemes weighted by the derived metric for the allocation schemes, and wherein the method further comprises: responsive to a predetermined stopping condition for the iteration, assigning resource consumers to resources in the communications system in accordance with an allocation scheme in a most recent generation determined to satisfy a ranking condition.

In some embodiments, generating a set of multiple allocation schemes includes generating a first allocation scheme according to an incumbent association of resource consumers to resources in the communications system, and generating a plurality of further allocation schemes based on random modifications to the first allocation scheme including modifications to associations between resource consumers and resources.

In some embodiments, the fitness measure for an allocation scheme is evaluated based on one or more criteria indicating a characteristic of the allocation scheme.

In some embodiments, the new set of allocation schemes in a generation of allocation schemes is defined as a highest ranking subset of a set of allocation schemes including the allocation schemes of a preceding generation and the allocation schemes generated based on selected pairs of allocation schemes in the preceding generation.

In some embodiments, each generation includes a number of allocation schemes equal to a number of allocation schemes in a preceding generation.

In some embodiments, the pairs of allocation schemes in a preceding generation are determined by dividing the set of allocation schemes in the preceding generation into two subsets of comparable size; ranking each subset of allocation schemes based on the fitness measure of each allocation scheme weighted by the derived metric for each allocation scheme; and selecting equally ranked allocation schemes in each subset as the pairs of allocation schemes.

In some embodiments, each allocation scheme in the at least a subset of allocation schemes for a generation is generated by copying one of the selected pair of allocation schemes in the preceding generation and selectively adjusting the copy by changing a predetermined proportion of resource consumers associated with at least some of the resources in the copy with resource consumers in a resource set of the other of the selected pair of allocation schemes.

In some embodiments, the predetermined proportion of resource consumers of the copy is determined based on a value of one of: the derived metric associated with at least one of the selected pair of allocation schemes; and the adjustable metric associated with at least one of the resources of at least one of the selected pair of allocation schemes.

In some embodiments, a value of an adjustable metric for an allocation scheme generated based on a selected pair of allocation schemes is determined based on adjustable metrics of the selected pair of allocation schemes.

In some embodiments, each generation includes at least one allocation scheme copied from a preceding generation and randomly adjusted by modifying at least one association between resource consumers and a resource in the allocation scheme.

In some embodiments, the stopping condition includes one or more of: a predetermined number of generations; a predetermined threshold measure of fitness; and one or more criteria in respect of a relative change in measures of fitness between generations.

In some embodiments, the ranking condition includes one or more of: a threshold degree measure of fitness; and a greatest degree measure of fitness.

In some embodiments, the criteria indicating a characteristic of the allocation scheme includes one or more of: an estimated power consumption of resources deployed in accordance with the allocation scheme; a measure of a proportion of used capacity of resources deployed in accordance with the allocation scheme; a measure of a proportion of spare capacity of resources deployed in accordance with the allocation scheme; and a measure of a quantity of resources deployed in accordance with the allocation scheme.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
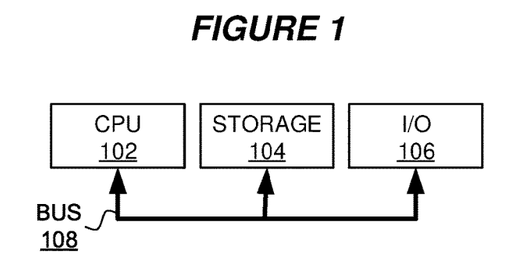
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Embodiments of the present disclosure generate allocation schemes each defining associations between communications network resources and resource consumers, and each being suitable for deployment by assigning resource consumers to resources in accordance with the allocation scheme. Thus, the relationships between resources and resource consumers represented by each allocation scheme are encoded by way of associations in the allocation scheme and constitute, in each scheme, one way a set of consumers may be associated with a set of resources. In embodiments of the invention, a plurality of such allocation schemes are constituted as a set of allocation schemes, with multiple such sets being generated over a plurality of generations of allocation schemes by use of a genetic algorithm. Genetic algorithms are known in the art such as from "Introduction to Genetic Algorithms" (Vijini Mallawaarachchi, July 2017, available at https://towardsdatascience.com. By way of overview, a genetic algorithm is a search heuristic for searching a solution space for an objective problem based on generations of prospective solutions. Thus, each generation has a population of prospective solutions that can be assessed for fitness in respect of an overall search objective. For example, such a fitness objective might include overall power consumption by resources in a scheme.

Genetic algorithms conventionally include representations of a chromosome containing genes in each prospective solution in a generation of solutions. Typically, generations of solutions include solutions derived from pairs of solutions in preceding generations by a process such as "crossover", according to which at least some genes in one of a pair of solutions are exchanged for genes in the other of the pair to new generate new solutions as derivatives of the solutions in a preceding generation. Embodiments of the present disclosure employ resources associated with resource consumers with multiple such resources collected together to constitute a single allocation scheme. The association between a resource and a set of consumers is akin to a chromosome, whereas the consumers in the set are akin to genes. Thus, each solution consists of multiple chromosomes representing resources, each having genes representing resource consumers. Embodiments of the present disclosure provide a measure of fitness for each allocation scheme evaluated based on the encoded set of resources and consumers in the scheme, such as by being evaluated based on one or more objective criteria indicating one or more characteristics of the scheme. For example, fitness criteria can include: a specific or relative power requirement for a particular allocation scheme; a threshold or minimum quantity of one or more resources required for a particular scheme; an estimated power consumption of resources deployed in accordance with the allocation scheme; a measure of a proportion of used capacity of resources deployed in accordance with the allocation scheme; a measure of a proportion of spare capacity of resources deployed in accordance with the allocation scheme; a measure of a quantity of resources deployed in accordance with the allocation scheme; and other fitness measures as will be apparent to those skilled in the art and dependent on the particular resources and consumers for which the processes are applied.

Embodiments of the present disclosure additionally apply an adjustable metric in association with each resource in each allocation scheme. The adjustable metric is indicative of an age of an association between the resource and a set of resource consumers—and thus the age of the chromosome defining the association. Thus, where an association between a resource and a set of resource consumers persists into a subsequent generation without modification, the metric is adjusted to indicate an increase in the age of the association (increasing age of that particular unamended chromosome). Where an association between a resource and resource consumers is adjusted by crossover or mutation in a subsequent generation, then the metric can be adjusted to indicate a lesser age (or a "rebirth") of the association—such as by resetting the metric to a starting or default value. Thus, the adjustable metric serves to identify relatively newer versus relatively older record/consumer associations (chromosomes). In some embodiments, a value of an adjustable metric associated with a derived (child) chromosome is determined based on the values of adjustable metrics associated with the corresponding chromosomes in the selected pair of allocation schemes (parents). For example, some aggregation, combination, normalization or other process can be applied to metrics of parent chromosomes to determine the metric for a child chromosome.

In some embodiments, a fuzzy logic association is provided between a value of an adjustable metric and one of a set of enumerated classes of the metric, such as low, medium, high and/or very low, very/high. Such fuzzy association can be normalized against the range of metric values in a population so as to ensure relative associations of chromosomes to classes remain appropriate. Further, in some embodiments, combinations of classes of metric can be employed to determine how two metrics for two parent chromosomes should be combined for a child chromosome. For example, a "low" and "low" metric combination can result in a "very low" child chromosome. A "low" and "medium" combination can result in a "low" child chromosome. A "low" and "high" combination can result in a "medium" child chromosome, and so on as will be apparent to those skilled in the art. In this way, the value of metrics associated with associations adjusts according to the metrics of parent associations on which they are based. Thus, a value of an adjustable metric for an allocation scheme generated based on a selected pair of allocation schemes can be determined based on adjustable metrics of the selected pair of allocation schemes.

A further metric is associated with each allocation scheme and, for each scheme, the further metric is derived from the adjustable metrics associated with resources/consumer associations in the allocation scheme. Thus, this further metric is referred to herein as a derived metric. For example, the further metric can be a summation, statistical mean, aggregate or other derivative of the adjustable metrics for an allocation scheme.

In embodiments of the present disclosure, an iterative genetic algorithm is applied to generations of allocation schemes in which pairs of schemes from a preceding generation are selected for generating derivative (child) schemes in a new generation by a crossover process. The pairs are selected based on a fitness measure associated with each scheme and weighted by the derived metric of each scheme. For example, in some embodiments a preceding generation of allocation schemes is divided into two subsets of generation schemes preferably of comparable size. Each such subset can be ranked based on the fitness measure weighted by the derived metric and equally or similarly ranked allocation schemes in each subset can be paired to constitute the pairs of allocation schemes for crossover of genes.

The crossover process in embodiments of the present disclosure provides for at least a subset of allocation schemes in a new generation being generated based on selected pairs of allocation schemes in a preceding generation. In conventional genetic algorithms, the crossover process involves crossing over genes in chromosomes between two solutions of a population to generate one or more derived solutions. Embodiments of the present disclosure apply a similar approach in which the association of consumers to resources are adjusted by crossing over consumers (akin to genes) between resources in each of the selected pair of allocation schemes. Constraints may apply to allocation schemes in embodiments of the present disclosure and these are respected by enforcing rules during the crossover process. For example, if crossover results in a consumer being associated with a resource in a scheme where the same consumer is associated elsewhere to a different resource in the same scheme, a resolution must be applied since the same consumer cannot be associated with two resources. Such resolution can be to skip or avoid such an individual crossover, or to adjust the other resource association for the consumer such that the consumer appears only once in the scheme.

In some embodiments, each allocation scheme in at least a subset of the schemes in a new generation (a new set of allocation schemes) is generated by copying one of a selected pair of allocation schemes in the preceding generation and selectively adjusting the copy so as to generate a derivative allocation scheme. In some embodiments, a predetermined proportion of resource consumers (genes) associated with at least some of the resources in the copy are exchanged with resource consumers in a resource set of the other of the selected pair of allocation schemes, noting however that the constraints discussed above may equally apply such that not all such exchanges may be effected. In some embodiments, the predetermined proportion of resource consumers for exchange is determined based on the derived metric associated with at least one of the selected pair of allocation schemes. Additionally, or alternatively, the predetermined portion can be determined based on the adjustable metric associated with at least one of the resources of at least one of the selected pair of allocation schemes. Thus, in this way, the extent of crossover (i.e. the number of genes crossed) between parent solutions in the population is determined based on either or both the adjustable and derived metrics.

Genetic algorithms can also include an element of stochastic adaptation through a process known as mutation according to which some allocation schemes in a new generation of solutions are adapted by one or more of: random crossover; random triggering of crossover; or other mutation operation as will be apparent to those skilled in the art. For example, a crossover process can be supplemented to provide that, responsive to a random determination (say some predetermined percentage of crossovers selected randomly), a predetermined or randomly selected proportion of the consumers (genes) are swapped either within an allocation scheme or by crossover with another selected allocation scheme. In this way an element of random mutation can be provided in the solution space. In some embodiments, at least one allocation scheme in a new generation of solutions copied from a preceding generation is randomly adjusted by modifying at least one association between resource consumers and a resource in the allocation scheme.

In some embodiments, a new generation of allocation schemes as a population of solutions includes newly generated (derived) allocation schemes based on selected pairs of allocation schemes from a preceding generation along with some subset of solutions from the preceding generation. For example, the set of allocation schemes for a new generation can be defined as a highest ranking subset of a set of allocation schemes including the allocation schemes of the preceding generation and the allocation schemes generated based on selected pairs of allocation schemes in the preceding generation. Such ranking can be weighted by the derived metric for allocation schemes as described above. For example, each generation of allocation schemes can have a size (in terms of a number of allocation schemes in the generation) that is predetermined and remains static such that the highest ranking subset is selected to have that predetermined size. Thus, in some embodiments each generation includes a number of allocation schemes equal to a number of allocation schemes in a preceding generation.

A first, primordial or initial generation of allocation schemes (solutions) is required for operation of embodiments of the present disclosure on which basis subsequent generations are generated iteratively by the genetic algorithm as previously described. In one embodiment, a set of multiple allocation schemes generated for an initial generation includes a first allocation scheme generated according to an incumbent association of resource consumers to resources in the communications system. For example, where the communications system has resources deployed with consumers associated with such resources, such deployment and consumer associations constitute incumbent associations constituting a basis for a first allocation scheme in an initial generation. The generation can be further populated by other allocation schemes such as allocation schemes generated by random modification to the first or other allocation schemes, such as modifications to associations between resource consumers and resources. Additionally, or alternatively, allocation schemes can be generated randomly for an initial generation. In some embodiments, the associations each allocation scheme of an initial generation are arranged to reflect the capabilities and capacities of resources in the communications system such that, for example, a number of consumers associated with a resource is indicative of a capacity of the resource. Such capacity can thus be respected throughout the genetic algorithm process including crossover to enforce as a criterion of the resource.

The process in accordance with the present disclosure operates by iterative application of the genetic algorithm until a predetermined stopping condition is satisfied. For example, the stopping condition can include one or more of: a predetermined number of generations; a predetermined threshold measure of fitness of an allocation scheme; and one or more criteria in respect of a relative change in measures of fitness between generations. On satisfaction of the stopping condition, the method assigns resource consumers to resources in the communications system in accordance with an allocation scheme in a most recent generation determined to satisfy a ranking condition. Such ranking condition can include, for example, one or more of: a threshold degree measure of fitness; and a greatest degree measure of fitness.

Thus, embodiments of the present disclosure provide for the allocation of communications network resources to resource consumers based on the adjustable metric and the corresponding derived metric for each allocation scheme. As the metrics adjust, indicating increasing age of solutions in the solution space, the weighting that the metrics have ranking of allocation schemes has a lower and lower effect until it is negligible. Once metrics start to reduce across the entire solution population, the fitness measure of solutions has a greater effect on ranking within the population. Thus, embodiments of the present disclosure provide for a generation with younger solutions indicated by the metrics exhibiting a more explorative nature in adaptation, whereas a generation with more established solutions indicated by the metrics exhibiting a more exploitative nature. This higher population diversity will yield better solutions in the long term as it gives the population more opportunities to avoid a local minima state.

Figure 2:
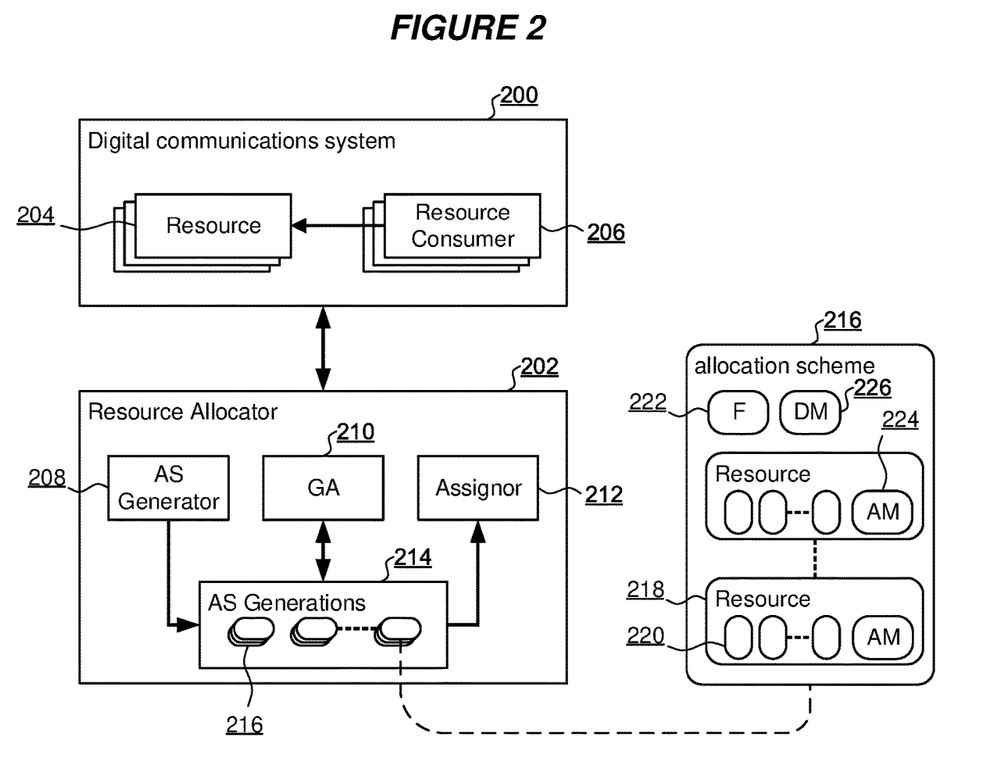
FIG. 2 is a component diagram of an arrangement for allocating a set of communications network resources to resource consumers in a digital communications system in accordance with some embodiments of the present disclosure.

FIG. 2 is a component diagram of an arrangement for allocating a set of communications network resources 204 to resource consumers 206 in a digital communications system 200 in accordance with some embodiments of the present disclosure. While the consumers 206 are illustrated as part of the communications system 200, it will be appreciated by those skilled in the art that the consumers could additionally or alternatively be external to the system 200. A resource allocator 202 is provided as a hardware, firmware, software or combination component arranged to allocate the resources 200 to the consumers 206 using a genetic algorithm 210 as previously described. The resource allocator 202 includes an allocation scheme generator 208 for generating an initial generation of allocation schemes. The initial generation of allocation schemes is subsequently processed by the genetic algorithm 210 on an iterative basis to generate a new set of allocation schemes 216 for each of a plurality of allocation scheme generations 214. The genetic algorithm 210 is operable iteratively until satisfaction of a stopping condition as previously described whereupon an assignor component 212 is operable to assign resource consumers 206 to the resources 204 in accordance with an allocation scheme in a most recent generation determined to satisfy a ranking condition as previously described.

By way of example, FIG. 2 depicts an exemplary allocation scheme 216 including a plurality of resources 218 each having association with one or more consumers 220 such that each resource is associated with the respective consumers 220. Each resource/consumer association has an adjustable metric 224 as previously described, on which basis the allocation scheme has a derived metric 226. The allocation scheme further has a fitness measure 222 evaluated based on the encoded set of resources 218 and consumers 220 in the allocation scheme.

Figure 3:
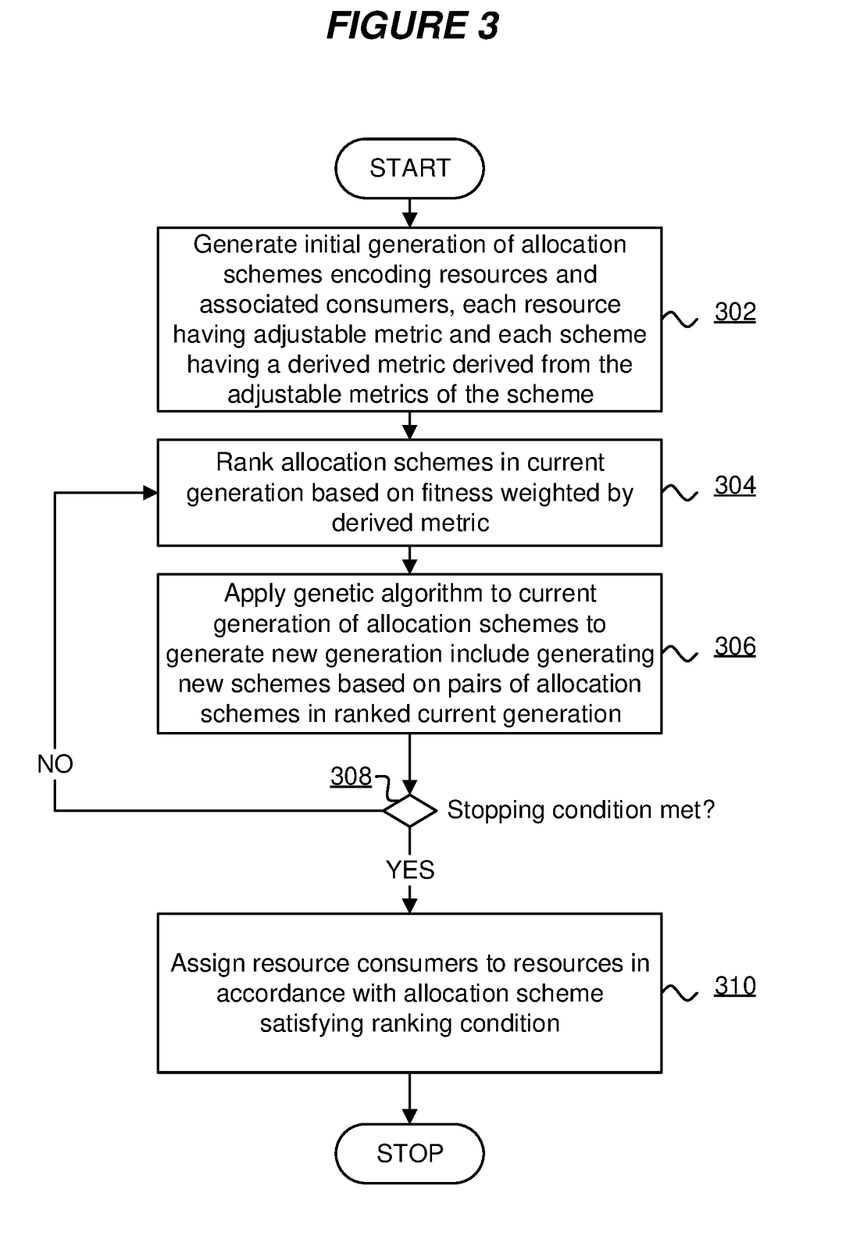
FIG. 3 is a flowchart of a method of allocating a set of communications network resources to resource consumers according to an embodiment of the present disclosure.

FIG. 3 is a flowchart of a method of allocating a set of communications network resources 204 to resource consumers 206 according to an embodiment of the present disclosure. At 302 the method generates an initial generation of allocation schemes encoding associations between resources 204 and consumers 206, each resource/consumer association indicated by each resource having an adjustable metric 224 and each allocation scheme having a measure of fitness and a derived metric as previously described. At 304 the method ranks allocation schemes in a current (most recent) generation of schemes based on fitness weighted by a derived metric of each scheme. At 306 the genetic algorithm is applied to the current generation of schemes to generate a new generation of schemes based on selected pairs of allocation schemes in the ranked current generation. The genetic algorithm iterates at 308 until the stopping condition is satisfied. Subsequently, at 310, the method assigns resource consumers 206 to resources 204 in accordance with the allocation scheme satisfying a predetermined ranking condition as previously described.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of allocating a set of communications network resources to resource consumers in a digital communications system, the method comprising:
   generating a set of multiple allocation schemes each encoding the set of communications network resources such that each communications network resource is associated with a set of resource consumers, wherein each allocation scheme has associated a fitness measure evaluated based on the encoded set of communications network resources and the resource consumers in the allocation scheme;
   iteratively applying a genetic algorithm to the set of multiple allocation schemes to generate, at each iteration, a new set of allocation schemes as a generation of allocation schemes based on a preceding generation of allocation schemes such that each allocation scheme in at least a subset of the set of multiple allocation schemes in a generation is generated based on selected pairs of allocation schemes in a preceding generation, wherein pairs of the allocation schemes are selected by ranking the allocation schemes in the preceding generation based on the fitness measures,
   wherein each communications network resource in each allocation scheme has associated an adjustable metric indicative of an age of an association between the communications network resource and the resource consumers in the allocation scheme, and the allocation scheme has associated a derived metric calculated based on the adjustable metric for each communications network resource in the allocation scheme,
   and wherein the ranking of the allocation schemes is based on the fitness measures of the allocation schemes weighted by the derived metric for the allocation schemes;
   responsive to a predetermined stopping condition for the iteration, assigning the resource consumers to the communications network resources in the communications system in accordance with an allocation scheme in a most recent generation determined to satisfy a ranking condition.

2. The method of claim 1, wherein generating a set of multiple allocation schemes includes generating a first allocation scheme according to an incumbent association of the resource consumers to the communications network resources in the communications system, and generating a plurality of further allocation schemes based on random modifications to the first allocation scheme including modifications to associations between the resource consumers and the communications network resources.

3. The method of claim 1, wherein the fitness measure for the allocation scheme is evaluated based on one or more criteria indicating a characteristic of the allocation scheme.

4. The method of claim 1, wherein the new set of allocation schemes in a generation of allocation schemes is defined as a highest ranking subset of a set of allocation schemes including the allocation schemes of a preceding generation and the allocation schemes generated based on selected pairs of allocation schemes in the preceding generation.

5. The method of claim 4, wherein each generation of allocation schemes includes a number of allocation schemes equal to a number of allocation schemes in a preceding generation.

6. The method of claim 1, wherein the pairs of allocation schemes in a preceding generation are determined by:
   dividing the set of allocation schemes in the preceding generation of allocation schemes into two subsets of comparable size;
   ranking each subset of allocation schemes based on the fitness measure of each allocation scheme weighted by the derived metric for each allocation scheme; and
   selecting equally ranked allocation schemes in each subset of allocation schemes as the pairs of allocation schemes.

7. The method of claim 1, wherein each allocation scheme in the at least a subset of allocation schemes for a generation is generated by copying one of the selected pair of allocation schemes in the preceding generation of allocation schemes, and selectively adjusting the copy by changing a predetermined proportion of resource consumers associated with at least some of the resources in the copy with resource consumers in a resource set of the other of the selected pair of allocation schemes.

8. The method of claim 7, wherein the predetermined proportion of resource consumers of the copy is determined based on a value of one of: the derived metric associated with at least one of the selected pair of allocation schemes; or the adjustable metric associated with at least one of the resources of at least one of the selected pair of allocation schemes.

9. The method of claim 1, wherein a value of an adjustable metric for an allocation scheme generated based on a selected pair of allocation schemes is determined based on adjustable metrics of the selected pair of allocation schemes.

10. The method of claim 1, wherein each generation includes at least one allocation scheme copied from a preceding generation and randomly adjusted by modifying at least one association between the resource consumers and a communications network resource in the allocation scheme.

11. The method of claim 1, wherein the stopping condition includes one or more of: a predetermined number of generations; a predetermined threshold measure of fitness; or one or more criteria in respect of a relative change in a measures of fitness between generations.

12. The method of claim 1, wherein the ranking condition includes one or more of: a threshold degree measure of fitness; or a greatest degree measure of fitness.

13. The method of claim 3, wherein the new set of allocation schemes in a generation of allocation schemes is defined as a highest ranking subset of a set of allocation schemes including the allocation schemes of a preceding generation and the allocation schemes generated based on selected pairs of allocation schemes in the preceding generation, and wherein the criteria indicating a characteristic of the allocation scheme includes one or more of: an estimated power consumption of resources deployed in accordance with the allocation scheme; a measure of a proportion of used capacity of resources deployed in accordance with the allocation scheme; a measure of a proportion of spare capacity of resources deployed in accordance with the allocation scheme; or a measure of a quantity of resources deployed in accordance with the allocation scheme.

14. A computer system comprising a processor and memory storing computer program code for performing the method of claim 1.

15. A non-transitory computer-readable storage medium comprising computer program code to, when loaded into a computer system and executed thereon, cause the computer system to perform the method as claimed in claim 1.

\* \* \* \* \*

UNITED STATES PATENT AND TRADEMARK OFFICE
CERTIFICATE OF CORRECTION

PATENT NO. : 12,107,772 B2
APPLICATION NO. : 18/264981
DATED : October 1, 2024
INVENTOR(S) : Lewis Veryard et al.

Page 1 of 2

It is certified that error appears in the above-identified patent and that said Letters Patent is hereby corrected as shown below:

On the Title Page

On page 2, in Column 2, under "Other Publications", Line 3, delete "Congcong , et al. ," and insert -- Congcong, et al., --.

On page 2, in Column 2, under "Other Publications", Line 7, delete "III ," and insert -- III, --.

On page 2, in Column 2, under "Other Publications", Line 8, delete "V. ," and insert -- V., --.

On page 2, in Column 2, under "Other Publications", Line 9, delete "Code" ," and insert -- Code", --.

On page 2, in Column 2, under "Other Publications", Line 10, delete "2023 ," and insert -- 2023, --.

On page 2, in Column 2, under "Other Publications", Line 11, delete "Adnan , et al. ," and insert -- Adnan, et al., --.

On page 2, in Column 2, under "Other Publications", Line 12, delete "Network" ," and insert -- Network", --.

On page 2, in Column 2, under "Other Publications", Line 15, delete "IV ," and insert -- IV, --.

On page 2, in Column 2, under "Other Publications", Line 16, delete "Nitin , et al. ," and insert -- Nitin, et al., --.

On page 2, in Column 2, under "Other Publications", Line 17, delete "Systems" ," and insert -- Systems", --.

On page 2, in Column 2, under "Other Publications", Line 21, delete "V ," and insert -- V, --.

Signed and Sealed this
Twenty-fifth Day of February, 2025

Coke Morgan Stewart
*Acting Director of the United States Patent and Trademark Office*

In the Specification

In Column 1, Line 45, delete "CLVAN" and insert -- CVLAN --.